US 8,938,328 B2

(12) United States Patent
Kume et al.

(10) Patent No.: US 8,938,328 B2
(45) Date of Patent: Jan. 20, 2015

(54) ELECTRIC VEHICLE AND METHOD OF CONTROLLING THE SAME

(75) Inventors: Yohei Kume, Osaka (JP); Tomohiro Shimoda, Tokyo (JP); Akihiro Ohta, Osaka (JP); Shohei Tsukada, Hyogo (JP); Hideo Kawakami, Osaka (JP); Tohru Nakamura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/236,107

(22) PCT Filed: Jul. 9, 2012

(86) PCT No.: PCT/JP2012/004431
§ 371 (c)(1),
(2), (4) Date: Jan. 30, 2014

(87) PCT Pub. No.: WO2013/021546
PCT Pub. Date: Feb. 14, 2013

(65) Prior Publication Data
US 2014/0180520 A1 Jun. 26, 2014

(30) Foreign Application Priority Data
Aug. 8, 2011 (JP) .................................. 2011-172778

(51) Int. Cl.
*B60L 15/20* (2006.01)
*B62D 51/00* (2006.01)
(Continued)

(52) U.S. Cl.
CPC ............. *B60L 15/20* (2013.01); *B60L 15/2036* (2013.01); *B62D 51/001* (2013.01);
(Continued)

(58) Field of Classification Search
None
See application file for complete search history.

(56) References Cited

U.S. PATENT DOCUMENTS 5,060,959 A * 10/1991 Davis et al. ................. 280/5.514
6,473,668 B2 * 10/2002 Abuzeid et al. ................ 700/121
(Continued)

FOREIGN PATENT DOCUMENTS

| | | |
|---|---|---|
| JP | 2001-354155 | 12/2001 |
| JP | 2006-315666 | 11/2006 |

(Continued)

OTHER PUBLICATIONS

International Search Report issued Sep. 25, 2012 in International (PCT) Application No. PCT/JP2012/004431.

*Primary Examiner* — Thomas Tarcza
*Assistant Examiner* — Alex C Dunn
(74) *Attorney, Agent, or Firm* — Wenderoth, Lind & Ponack, LLP.

(57) ABSTRACT

An electric vehicle which travels by driving actuators includes: a monitor unit which monitors external environment or internal environment of the electric vehicle; an alarm unit which outputs, based on monitoring information obtained by the monitoring unit, a vibration velocity signal indicating velocity which changes in a cycle; a travel information generation unit which calculates a target travel velocity based on a steering direction and a control input provided by an operator of the electric vehicle, and generates travel control information for controlling the actuators based on the target travel velocity; and a control unit which controls the actuators based on the travel control information. The travel information generation unit regenerates the travel control information by adding the vibration velocity signal to the target travel velocity upon receiving the vibration velocity signal.

11 Claims, 11 Drawing Sheets

(51) Int. Cl.
  *B62D 51/04* (2006.01)
  *B60L 11/18* (2006.01)
  *A61G 5/04* (2013.01)
  *B62B 5/00* (2006.01)

(52) U.S. Cl.
  CPC ............ *B62D 51/002* (2013.01); *B62D 51/04* (2013.01); *B60L 11/1861* (2013.01); *B60L 2200/16* (2013.01); *B60L 2200/34* (2013.01); *B60L 2220/46* (2013.01); *B60L 2240/12* (2013.01); *B60L 2250/10* (2013.01); *B60L 2250/24* (2013.01); *B60L 2260/28* (2013.01); *B60L 2260/34* (2013.01); *B60L 2270/145* (2013.01); *A61G 5/043* (2013.01); *A61G 5/046* (2013.01); *A61G 2203/14* (2013.01); *B62B 5/0069* (2013.01); *B60L 2240/547* (2013.01)
  USPC .......................................................... 701/22

(56) References Cited

U.S. PATENT DOCUMENTS

| | | | |
|---|---|---|---|
| 7,343,222 B2 * | 3/2008 | Solomon ..................... 700/245 |
| 7,360,616 B2 * | 4/2008 | Schiele ................... 180/65.265 |
| 7,364,196 B2 * | 4/2008 | Akutagawa et al. .......... 280/757 |
| 7,717,200 B2 | 5/2010 | Kakinuma et al. |
| 7,809,601 B2 * | 10/2010 | Shaya et al. ................. 705/7.31 |
| 7,958,956 B2 | 6/2011 | Kakinuma et al. |
| 8,028,777 B2 | 10/2011 | Kakinuma et al. |
| 8,191,874 B2 * | 6/2012 | Inoue et al. ................. 267/64.24 |
| 8,225,891 B2 | 7/2012 | Takenaka et al. |
| 8,515,612 B2 * | 8/2013 | Tanaka et al. .................... 701/25 |
| 8,548,678 B2 * | 10/2013 | Ummethala et al. ............ 701/37 |
| 8,581,714 B2 * | 11/2013 | Yu et al. ........................ 340/435 |
| 8,632,136 B2 * | 1/2014 | Nozawa et al. ................... 303/3 |
| 8,666,844 B2 * | 3/2014 | Shaya et al. ................. 705/26.7 |
| 2005/0046584 A1 * | 3/2005 | Breed ...................... 340/825.72 |
| 2006/0260857 A1 | 11/2006 | Kakinuma et al. |
| 2007/0251735 A1 | 11/2007 | Kakinuma et al. |
| 2009/0032323 A1 | 2/2009 | Kakinuma et al. |
| 2009/0288900 A1 | 11/2009 | Takenaka et al. |

FOREIGN PATENT DOCUMENTS

| | | |
|---|---|---|
| JP | 2007-152019 | 6/2007 |
| JP | 2007-203973 | 8/2007 |
| JP | 2008-230295 | 10/2008 |
| JP | 2009-196493 | 9/2009 |
| JP | 2009-280132 | 12/2009 |
| JP | 2010-149575 | 7/2010 |

* cited by examiner

ELECTRIC VEHICLE AND METHOD OF CONTROLLING THE SAME

TECHNICAL FIELD

The present invention relates to electric vehicles, such as an electric wheelchair which travels with an operator aboard or an electric carrier cart which travels accompanied by an operator, and a method of controlling the electric vehicles.

BACKGROUND ART

There have been wheelchairs and carrier carts available as electric vehicles which are propelled by means of a drive unit.

Some electric vehicles have an alarm unit which, using sound or light, notifies an operator of information on low power of a battery unit to supply power to a drive unit. Some electric vehicles have an alarm unit which, using sound or light, notifies an operator of information on an obstacle detected ahead in a traveling direction by a sensor.

However, when such information on low battery or detection of an obstacle is sent to an operator using light, the operator may overlook the information because the light is emitted incidentally out of sight of the operator. When such information is sent to an operator using sound, the operator may miss the information because the electric vehicle is incidentally traveling in a noisy place. It is therefore desired that electric vehicles be provided which send operators information by means other than sound or light.

Although this is not a technique for electric vehicles such as a wheelchair and a carrier cart, there is a proposed braking force control device 1 for motor vehicles which provides a driver with haptic information using vibration of a vehicle body caused by actuating the brake of the vehicle in a certain pattern (see Patent Literature (PTL) 1).

FIG. 21 is a system configuration diagram of the conventional braking force control device 1 for motor vehicles.

As shown in FIG. 21, the braking force control device 1 has a control unit 2 including a judgment means 3 and an alarming means 4. The judgment means 3 judges, from a result of detection by a radar device 5, whether or not contact with an obstacle is evitable. When the judgment means 3 judges that there is a danger of the vehicle contacting with an obstacle, the alarming unit 4 alarms a driver using a warning image or a warning sound. The alarming unit 4 also alarms a driver by applying a pulsative braking force (warning brake) to slow the motor vehicle and generate vibration to be perceived by the driver.

When the alarming unit 4 gives a driver a haptic alarm by applying such warning brake, the alarming unit 4 issues a braking instruction to a brake control unit 6 to activate a brake actuator 7 so that a braking force is generated by pulsatively actuating a brake 8, which is a braking means. The vehicle is then vibrated by the braking force, so that the driver notices that there is a danger of the motor vehicle contacting with an obstacle.

In this configuration, when the motor vehicle disclosed in PTL 1 detects an obstacle with which the vehicle may contact, the vehicle activates a brake so that the vehicle can decelerate and give the driver a haptic alarm.

CITATION LIST

Patent Literature

[PTL 1]

Japanese Unexamined Patent Application Publication No. 2008-230295

SUMMARY OF INVENTION

Technical Problem

The motor vehicle disclosed in PTL 1 inevitably decelerates when giving a driver such information because the giving of information to a driver is achieved by generating pulsative braking force. In other words, there is a problem that when information is given to a driver using vibration, the motor vehicle may be controlled (for example, the motor vehicle may be decelerated) against an operation intended by a driver.

Conceived to address the problem, the present invention has an object of providing an electric vehicle capable of traveling based on an operation by an operator while giving information to the operator using vibration, and a method of controlling the electric vehicle.

Solution to Problem

In order to achieve the object, an electric vehicle which travels by driving actuators according to the present invention is provided including: a monitor unit configured to monitor external environment or internal environment of the electric vehicle; an alarm unit configured to output a vibration velocity signal based on monitoring information obtained by the monitor unit, the vibration velocity signal indicating velocity which changes in a cycle; a travel information generation unit configured to calculate a target travel velocity based on a steering direction and a control input provided by an operator of the electric vehicle, and generate travel control information for controlling the actuators based on the target travel velocity; and a control unit configured to control the actuators based on the travel control information, wherein the travel information generation unit is configured to regenerate the travel control information by adding the vibration velocity signal to the target travel velocity upon receiving the vibration velocity signal.

In order to achieve the object, a method of controlling an electric vehicle according to the present invention which travels by driving actuators is also provided. The method includes: monitoring external environment or internal environment of the electric vehicle to obtain monitoring information; outputting a vibration velocity signal based on the monitoring information, the vibration velocity signal indicating velocity which changes in a cycle; calculating a target travel velocity based on a steering direction and a control input provided by an operator of the electric vehicle, generating travel control information for controlling the actuators based on the target travel velocity, and upon receiving the vibration velocity signal, regenerating the travel control information by adding the vibration velocity signal to the target travel velocity; and controlling the actuators based on the travel control information.

Effects of Invention

According to the present invention, an electric vehicle is capable of traveling based on an operation by an operator while giving information to the operator using vibration.

DESCRIPTION OF EMBODIMENTS

The following describes embodiments of the present invention with reference to the drawings. It should be noted that the following embodiments are each merely an example of the present invention. The scope of the present invention is thus not limited to the embodiments but is defined by the claim language with reference to the following embodiments.

It should also be noted that the same components are denoted with the same reference signs and the descriptions thereof may be omitted. The drawings show each constituent element schematically for the sake of ease of understanding.

[Embodiment 1]

Figure 1:
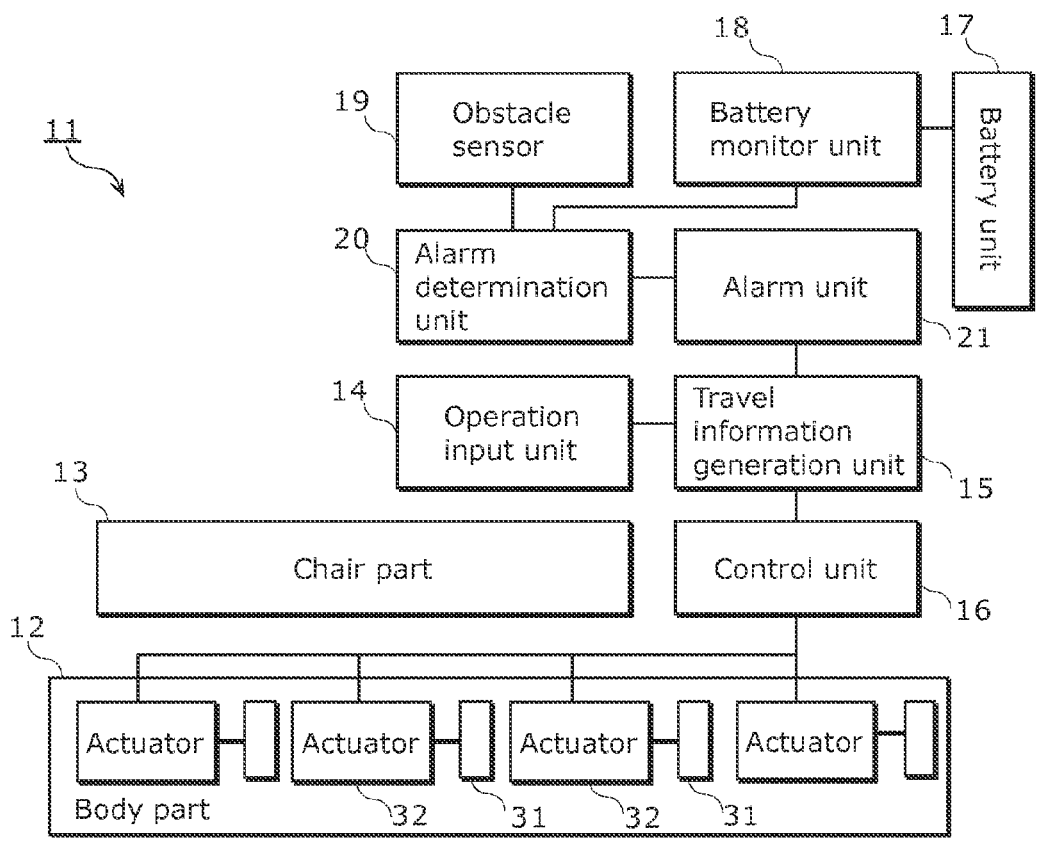
FIG. 1 shows a schematic configuration of an electric vehicle.
Figure 2:
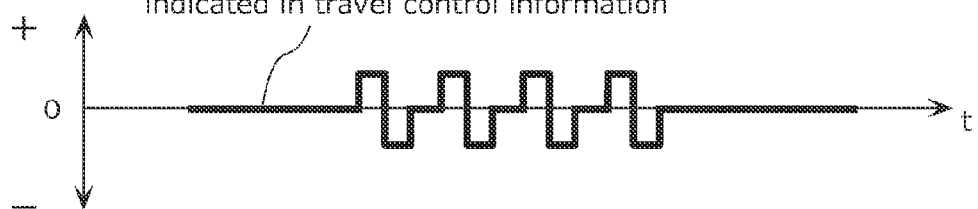
FIG. 2 is a time series chart of travel control information indicating the magnitude of velocity perpendicular to the direction of a target translational travel velocity.
Figure 3:
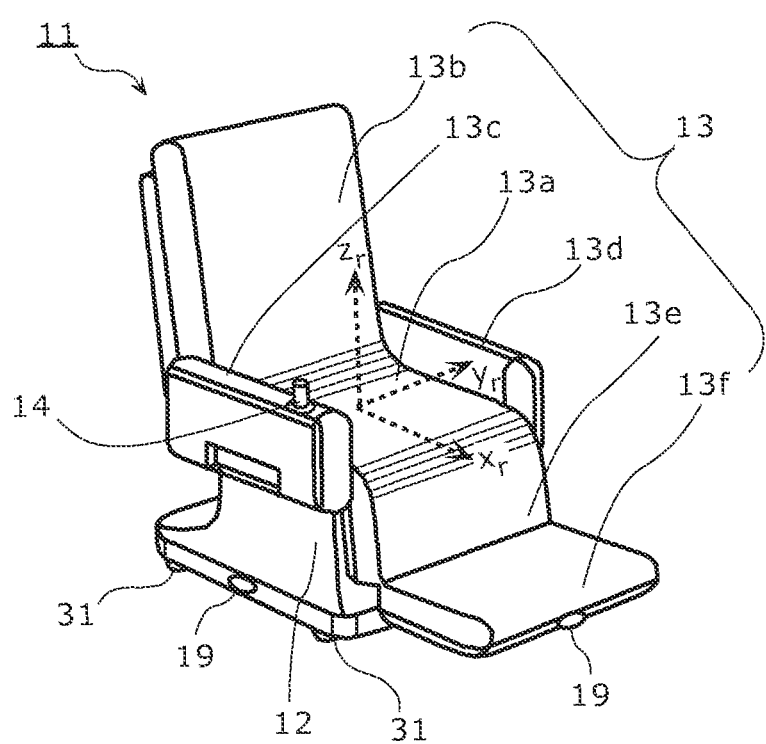
FIG. 3 shows a perspective view of an electric vehicle according to Embodiment 1.
Figure 4:
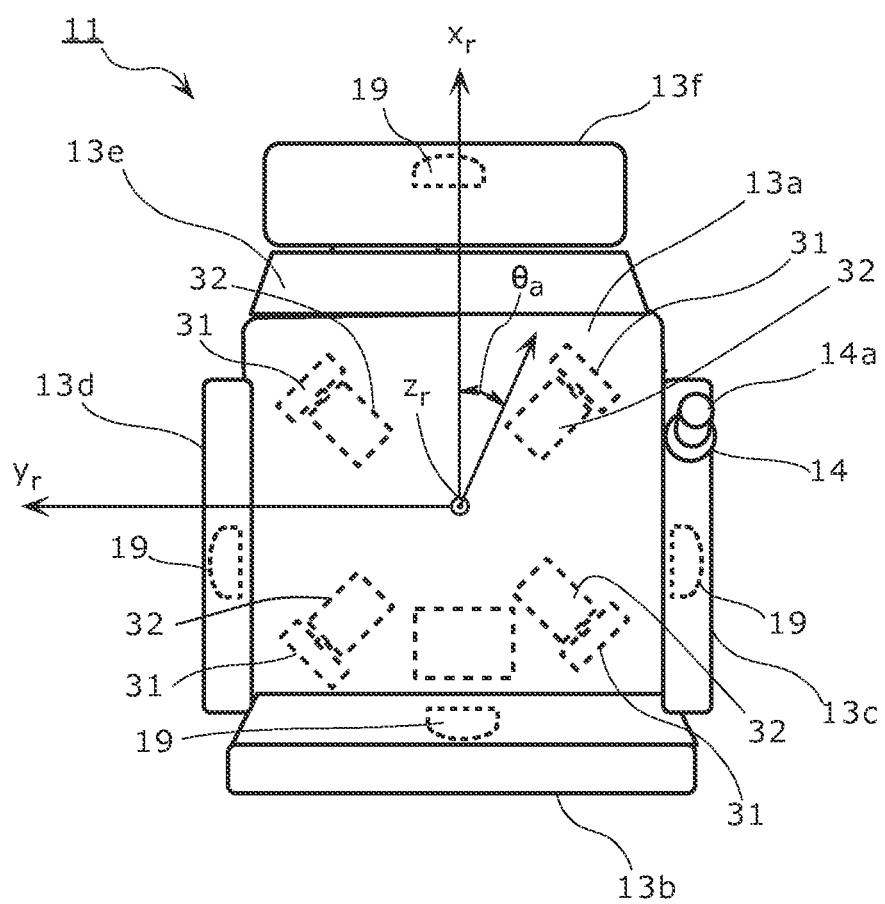
FIG. 4 shows a plan view of the electric vehicle according to Embodiment 1.

FIG. 1, FIG. 2, FIG. 3, and FIG. 4 are drawings for illustration of an electric vehicle 11 according to Embodiment 1 of the present invention. FIG. 1 shows a schematic configuration of the electric vehicle 11. FIG. 2 is a time series chart of travel control information indicating the magnitude of velocity perpendicular to the direction of a target translational travel velocity. FIG. 3 shows a perspective view of the electric vehicle 11 according to Embodiment 1, FIG. 4 shows a plan view of the electric vehicle 11 according to Embodiment 1.

As shown in FIG. 1, FIG. 2, FIG. 3, and FIG. 4, the electric vehicle 11 according to Embodiment 1 is an electric wheelchair which travels based on an operation by an operator sitting in a chair part 13. For the sake of ease of understanding, assume a vehicle coordinate system $\Sigma r$ (a coordinate system having three mutually-perpendicular axes of $x_r$, $y_r$, and $Z_r$) which moves synchronously with the electric vehicle 11. The plane including the $x_r$ axis and the $y_r$ axis is a horizontal plane parallel to level ground. The positive direction of the $x_r$ axis is the direction of forward traveling of the electric vehicle 11.

The electric vehicle 11 includes: a body part 12, the chair part 13; an operation input unit 14; a travel information generation unit 15; a control unit 16; a battery unit 17; a monitor unit (including an obstacle sensor 19 and a battery monitor unit 18, for example); an alarm determination unit 20; and an alarm unit 21.

The chair part 13 provided on the body part 12 and is an operator-contact part. The operation input unit 14 detects a steering direction and a control input provided thereto. The travel information generation unit 15 generates travel control information from the steering direction and control input. The battery unit 17 provides electric power to actuators 32, the control unit 16, and so on. The monitor unit (including an obstacle sensor 19 and a battery monitor unit 18, for example) monitors external environment, which is environment outside the electric vehicle 11, and internal environment, which is environment inside the electric vehicle 11. The battery monitor unit 18, which is a monitor unit to monitor the internal environment of the electric vehicle 11, measures electric power remaining in the battery unit 17. The obstacle sensor 19, which is an example of a monitor unit to monitor external environment, detects an obstacle. The obstacle is an example of an object to be monitored as the external environment.

The body part 12 includes the actuators 32 which rotate wheels 31 independently of each other. More specifically, the body part 12 includes four of the actuators 32. As shown in FIG. 4, the actuators 32 are installed at the bottom of the body part 12 so that respective rotary shafts of the actuators 32 are arranged in the form of an X. Each of the rotary shafts of the actuators 32 has the wheel 31 attached thereto. Examples of the wheel 31 include an omni wheel, which is capable of rolling in all directions. The actuators 32 rotate the wheels 31 independently of each other so that the body part 12 can travel in all directions, that is, in front-back directions, left-right directions, and oblique directions. The above-described electric vehicle 11 may be made to travel in any direction by using a device other than the omni wheels as the wheels 31 as described above, such as Mecanum wheels.

The operator-contact part is a contact area between an operator and the electric vehicle 11. In Embodiment 1, the operator-contact part is configured to transmit vibration of the body part 12 to an operator. The electric vehicle 11 in Embodiment 1 includes the chair part 13 where an operator is to be seated as the operator-contact part.

As shown in FIG. 3, the chair part 13 is oriented to have front-back directions along the $x_r$ axis and left-right directions along the $y_r$ axis, and includes a seat 13a, a backrest 13b rising at the back of the seat, arm rests 13c and 13d provided at the lateral sides of the seat 13a, and a leg rest 13e and a foot rest 13f provided at the front of the seat 13a.

The operation input unit 14 is located on an upper surface of the arm rest 13c and includes a joystick 14a (see FIG. 4).

The operation input unit 14 detects a translational component and a rotational component of input provided by an operator from a tilt and a twist of the joystick 14a used by an operator, and determines a steering direction and a control input provided by the operator. The operation input unit 14 determines the steering direction and control input of a translational component provided by an operator, from the direction and magnitude of a tilt of the joystick 14a. Furthermore, the operation input unit 14 determines the steering direction and control input of a rotational component provided by an operator, from the direction and magnitude of a twist of the joystick 14a.

The travel information generation unit 15 (see FIG. 1) calculates a target travel velocity (in Embodiment 1, this includes a target translational travel velocity and a target rotational travel velocity) from a steering direction and a control input determined by the operation input unit 14. The travel information generation unit 15 then generates, based on the calculated target travel velocity, travel control information for control of the actuators 32 so that the electric vehicle 11 travels at the target travel velocity.

A target translational travel velocity has magnitude and direction. The direction of a target translational travel velocity is represented by angle θa shown in FIG. 4. The angle θa corresponds to the angle of a translational component of a steering direction. When the direction of a target translational travel velocity has an angle θa of 0°, the direction coincides with the $x_r$ axis. The magnitude of a target translational travel velocity has a value calculated by multiplying a translational component of a control input determined by the operation input unit 14 by a predetermined conversion coefficient. In Embodiment 1, an apparent viscosity coefficient D is set for traveling of the electric vehicle 11, and 1/D is used as the conversion coefficient. More specifically, a target translational travel velocity is calculated by multiplying a control input determined by the operation input unit 14 by 1/D. The magnitude of target translational travel velocity is proportional to the magnitude of a translational component of control input, and the direction of a target translational travel velocity corresponds to a translational component of a steering direction. The travel control information indicates the same direction and the same magnitude as a target translational travel velocity unless the travel information generation unit 15 receives a vibration velocity signal, which is described later.

A target rotational travel velocity has magnitude and direction, and the rotational direction of a target rotational travel velocity corresponds to a rotational component of a steering direction. The magnitude of a target rotational travel velocity has a value calculated by multiplying a rotational component of a control input determined by the operation input unit 14 by a predetermined conversion coefficient.

The control unit 16 controls the actuators 32 based on travel control information to move the body part 12.

The alarm determination unit 20 uses a value measured by the battery monitor unit 18 and a value detected by the obstacle sensor 19 to determine whether or not to alarm an operator. In other words, the alarm determination unit 20 determines whether or not to alarm an operator, based on monitoring information from the monitor unit. More specifically, the alarm determination unit 20 determines to alarm an operator when monitoring information received from the monitor unit exceeds a predetermined threshold value, for example.

The alarm unit 21 generates and outputs a vibration velocity signal having square waves when the alarm determination unit 20 determines to alarm an operator. Then, upon receiving a vibration velocity signal, the travel information generation unit 15 generates travel control information by adding a vibration velocity signal to target travel velocity. In Embodiment 1, a vibration velocity signal is added to a target translational travel velocity, which is a translational component of a target travel velocity, perpendicularly to a direction of the target translational travel velocity.

The alarm unit 21 may preliminarily hold a vibration velocity signal to output without generating a vibration velocity signal before the outputting.

The vibration velocity signal indicates velocity in a two-dimensional plane (horizontal plane). The velocity has a fixed direction and magnitude which changes in a cycle. In Embodiment 1, the velocity indicated by the vibration velocity signal has a direction perpendicular to the direction of a target translational travel velocity.

When the alarm determination unit 20 determines to alarm an operator, the travel information generation unit 15 of the electric vehicle 11 generates travel control information indicating vibration perpendicular to a target translational travel velocity as shown in FIG. 2. By traveling under control by the control unit 16 based on the travel control information, the electric vehicle 11 notifies an operator of information using vibration with no influence on the magnitude of the target translational travel velocity. Note that for the notifying an operator of information, the electric vehicle 11 adds the vibration velocity signal only to the translational component of the target travel velocity.

Figure 5:
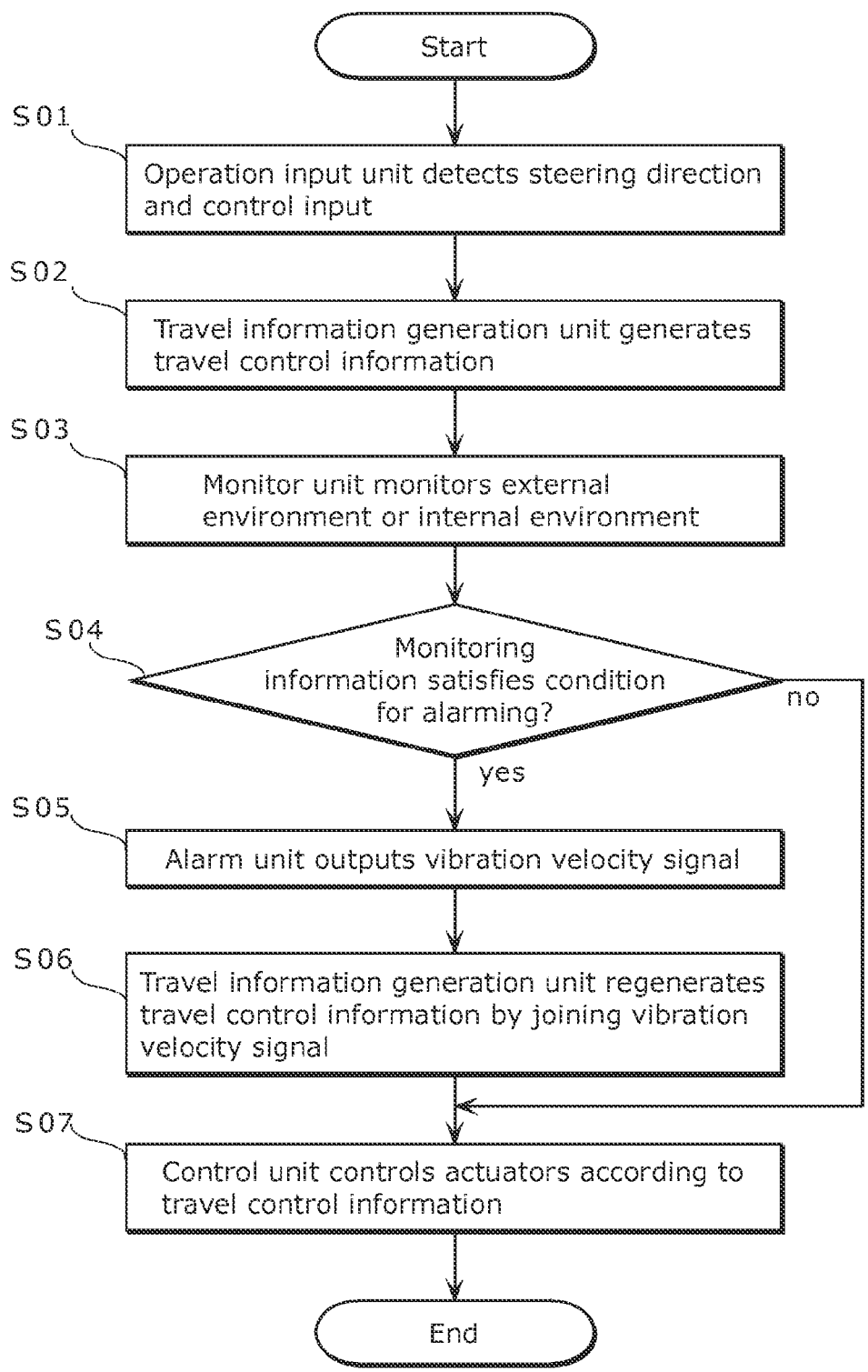
FIG. 5 is a flowchart showing steps in control for moving the electric vehicle according to Embodiment 1.
Figure 6:
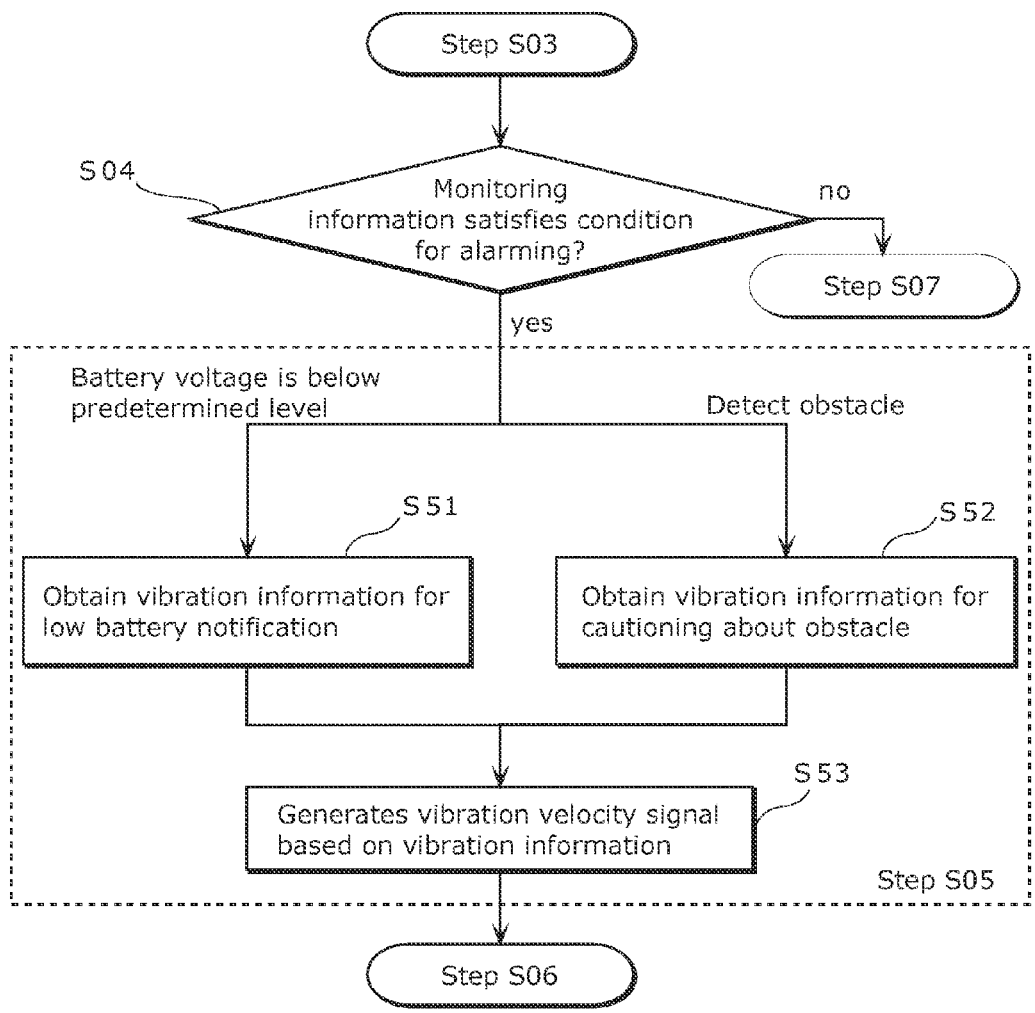
FIG. 6 is a flowchart showing details of steps in generation of a vibration velocity signal.
Figure 7:
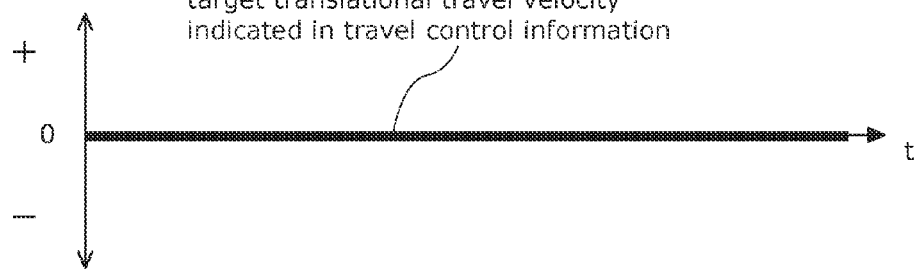
FIG. 7 is a time series chart of travel control information indicating the magnitude of velocity perpendicular to the direction of a target translational travel velocity according to Embodiment 1.
Figure 8:
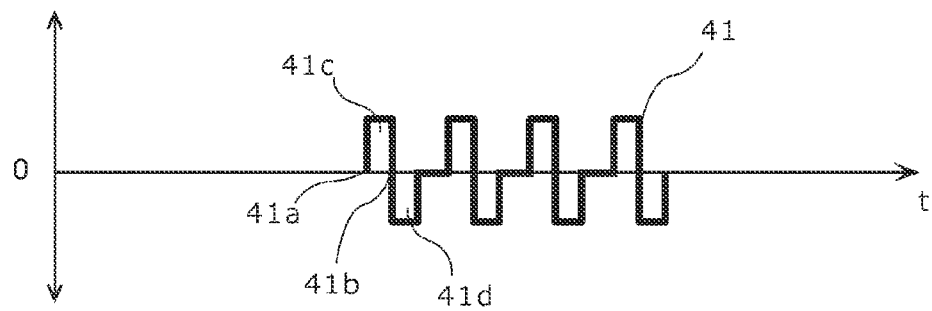
FIG. 8 is a time series chart of a vibration velocity signal according to Embodiment 1.
Figure 9:
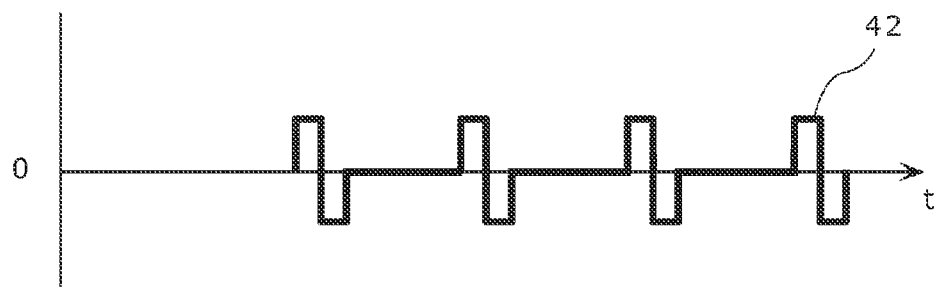
FIG. 9 is a time series chart of a vibration velocity signal according to Embodiment 1.

The following is description of control of the electric vehicle 11 including description of operation of the electric vehicle 11. FIG. 5 is a flowchart showing steps in control for moving the electric vehicle 11 according to Embodiment 1. FIG. 6 is a flowchart showing details of steps in generation of a vibration velocity signal. FIG. 7 is a time series chart of travel control information indicating the magnitude of velocity perpendicular to the direction of a target translational travel velocity. FIG. 8 and FIG. 9 each are a time series chart of a vibration velocity signal. FIG. 8 is a time series chart of a first vibration velocity signal 41. FIG. 9 is a time series chart of a vibration velocity signal 42.

As shown in FIG. 5, in the electric vehicle 11 activated by an operator or other using a power switch, the operation input unit 14 detects a steering direction and a control input provided by the operator (Step S01).

When the operator tilts the joystick 14a forward to a certain (medium) angle, the operation input unit 14 detects a steering direction having a forward translational component and a control input having a translational component at a medium level. Note that the target translational travel velocity is proportional to control input detected by the operation input unit 14. Although the operation input unit 14 is capable of stepless detection of control input, the magnitude of control input is described in the following as a control input at a high level, a medium level, or a low level for the sake of ease of understanding.

Next, the travel information generation unit 15 calculates a target translational travel velocity. In this case, the calculated target translational travel velocity has a direction of forward travel and a magnitude of 4 km/h, which is a medium speed. The travel information generation unit 15 then generates travel control information based on the target translational travel velocity. When the joystick 14a is not twisted at all, a target rotational travel velocity is calculated to be 0 km/h (Step S02).

Forward travel of the electric vehicle 11 is parallel to the $x_r$ axis. When a translational component of a steering direction is oblique to the $x_r$ axis, an angle θa of the target translational travel velocity is determined with respect to the x, axis at an angle of 0°. While the operator keeps the joystick 14a tilted forward, the travel information generation unit 15 keeps generating travel control information which indicates that a velocity perpendicular to the target translational travel velocity has a magnitude of 0 km/h as shown in FIG. 7.

The maximum speed of the electric vehicle 11 in Embodiment set at 6 km/h. When a control input at a high level is provided to the electric vehicle 11, target translational travel velocity is set to 6 km/h. When a control input at a medium level is provided, target translational travel velocity is set to 4 km/h. When a control input at a low level is provided, target translational travel velocity is set to 2 km/h. When the control input is 0, the target travel velocity is set to 0 km/h to stop the electric vehicle 11.

When the joystick 14a is twisted and thus a target rotational travel velocity is calculated, the electric vehicle 11 rotates at the target rotational travel velocity. When the joystick 14a is tilted and twisted at the same time, a target translational travel velocity and a target rotational travel velocity are both calculated, and the electric vehicle 11 does translational travel while rotating based on the target translational travel velocity and the target rotational travel velocity.

After travel control information is generated, the monitor unit monitors external environment or internal environment. More specifically, the battery monitor unit 18 measures voltage of the battery unit 17. Furthermore, the obstacle sensor 19 detects an obstacle in an area around the electric vehicle 11 (Step S03).

Next, the alarm determination unit 20 determines whether or not monitoring information obtained by the monitor unit satisfies a condition for alarming an operator. More specifically, when the voltage measured by the battery monitor unit 18 has a value smaller than a predetermined value, the alarm determination unit 20 determines that it is necessary to notify an operator of low battery. When an obstacle detected by the obstacle sensor 19 is within a range of distance from the obstacle sensor 19, the alarm determination unit 20 determines that it is necessary to notify an operator of the obstacle by alarming the operator (Step S04).

Next, when the alarm determination unit 20 determines that the monitoring information satisfies a condition for alarming (Step S04, yes) and thus notifying an operator of information is necessary, the alarm unit 21 generates a vibration velocity signal 41 or 42. The vibration velocity signals 41 and 42 are signals which oscillate around a reference value (the value indicated by 0 in the drawings) as shown in FIG. 8 and FIG. 9, respectively (Step S05).

Step S05 is detailed below. When it is determined that the voltage of the battery unit 17 measured by the battery monitor unit 18 has a value below a predetermined value, the vibration velocity signal generation unit of the alarm unit 21 obtains vibration information for low battery notification from a vibration information storage unit of the alarm unit 21 as shown in FIG. 6 (Step S51).

When the obstacle sensor 19 detects an obstacle within a range of distance, the vibration velocity signal generation unit of the alarm unit 21 obtains, from the vibration information storage unit of the alarm unit 21, vibration information for notifying an operator of an obstacle (Step S52).

For example, the vibration information for low battery notification indicates vibration having a fixed magnitude, a direction perpendicular to the direction of a target translational travel velocity, and intervals of 0.2 s. For example, the vibration information for notifying an operator of an obstacle indicates vibration having a fixed magnitude larger than the magnitude of the vibration for low battery notification, a direction perpendicular to the direction of a target translational travel velocity, and intervals longer than the intervals for low battery notification (1 s). The vibration velocity signals 41 or 42 is thus generated based on the vibration information and outputted (Step S53).

In Embodiment 1, the value of the magnitude of vibration indicated by the vibration information is not limited to a fixed value but may vary in proportion to the magnitude of target translational travel velocity. For example, it is possible to enable an operator traveling faster to notice an alarm sooner by using vibration of a larger magnitude for a higher target translational travel velocity.

In Embodiment 1, the vibration direction indicated in vibration information for low battery notification and vibration information for notifying an operator of an obstacle may be a direction fixed to the body part 12 similarly to the direction of the x, axis or the direction of the $y_r$ axis, instead of the direction perpendicular to a target translational travel velocity as described above.

When the condition for notifying an operator of low battery and the condition for notifying an operator of an obstacle are both satisfied at the same time, the notifying an operator of an obstacle may be given priority and only a vibration velocity signal for notifying an operator of an obstacle may be generated. This will allow an operator to identify what the vibration is notifying to the operator.

Optionally, vibration information for low battery notification may indicate a vibration direction having a rotational component. In this case, a vibration velocity signal may be generated by combining a vibration velocity signal for notifying an operator of an obstacle and a vibration velocity signal for low battery notification. In Embodiment 1, translational components and rotational components of vibrations are distinguishable to operators feeling the vibrations, and thus the electric vehicle 11 according to Embodiment 1 can notify an operator of low battery and notify the operator of an obstacle by the vibrations at the same time.

When the alarm unit 21 outputs the vibration velocity signal 41, the travel information generation unit 15 receives the vibration velocity signal 41, and regenerate travel control information by adding the vibration velocity signal 41 to the target travel velocity perpendicularly to the direction of the target travel velocity. When the vibration velocity signal 41 is added to the target velocity of travel control information perpendicularly, travel control information is regenerated which indicates a velocity variable in magnitude perpendicularly to the direction of the target velocity as shown in FIG. 2 (Step S06).

Next, the control unit 16 controls the actuator 32 based on travel control information. The electric vehicle 11 then travels with vibration perpendicularly to a steering direction. The vibration makes the operator of the electric vehicle 11 to notice that the electric vehicle 11 is running out of battery or that there is an obstacle near ahead of the electric vehicle 11 (Step S07).

When the monitoring information does not satisfy a condition for alarming (Step S04, no), the control unit 16 controls the actuators 32 based on the travel control information (including no vibration information) generated in Step S03. The electric vehicle 11 then travels without vibrating (Step S07).

Control for moving the electric vehicle 11 is performed by repeating a cycle of Step S01 to Step S07 described above.

In this manner, when the electric vehicle 11 notifies an operator of information, the travel information generation unit 15 adds a square wave to a target translational travel velocity and thereby regenerates travel control information. Upon receiving the travel control information, the electric vehicle 11 vibrates with respect to the target translational travel velocity. In Embodiment 1, even while notifying an operator of information, the electric vehicle 11 travels without acceleration or deceleration in a direction along a steering direction. In other words, in Embodiment 1, the target translational travel velocity has a constant magnitude regardless of whether or not any information is notified to an operator. Thus, the electric vehicle 11 according to Embodiment 1 is capable of traveling based on operation by an operator while notifying the operator of information.

The electric vehicle 11 according to Embodiment 1 is useful especially when an operator is notified of information that deceleration is necessary, for example, when an operator is notified of necessity of deceleration for avoiding collision with an obstacle ahead. For example, the electric vehicle 11 according to Embodiment 1 is advantageous in operability when an operator is notified of information that deceleration is unnecessary, for example, when an operator is notified of information that the battery is low, because the electric vehicle 11 need not be accelerated after the notification of information.

Furthermore, in Embodiment 1, the electric vehicle 11 is capable of providing an operator with haptic information by utilizing the actuators 32 which the electric vehicle 11 has already included, that is, without using any new drive source.

Optionally, the electric vehicle 11 may vibrate not perpendicularly to a steering direction but along a rotational direction. To put it another way, the travel information generation unit 15 may generate, upon receiving a vibration velocity signal, travel control information by adding the vibration velocity signal to a target rotational travel velocity. When travel control information is thus generated, the electric vehicle 11 vibrates rotationally with respect to the target rotational travel velocity. In this manner, the electric vehicle 11 is capable of notifying an operator of information using vibration without influencing the magnitude of target translational travel velocity even when adding a vibration velocity signal to a target rotational travel velocity.

Furthermore, in Embodiment 1, when the monitor unit detects an obstacle right of the electric vehicle 11, the alarm unit 21 may shift the rotational center of target rotational travel velocity to the left of the electric vehicle 11 compared to a normal position which is used when no obstacle is detected. Furthermore, in Embodiment 1, when the monitor unit detects an obstacle left of the electric vehicle 11, the alarm unit 21 may shift the rotational center of target rotational travel velocity to the right compared to the normal position. The rotational center is thus shifted to a direction opposite to the direction of an obstacle detected by the monitor unit, so that the body part 12 swings larger in the side closer to the obstacle. An operator can tell the direction of the obstacle from the difference in amplitude of swing between the right side and the left side.

When an operator seated in the chair part 13 of the electric vehicle 11 has difficulty in holding up the trunk and back-forth vibration may trouble the operator, it is preferable to limit the vibration of body part 12 the to lateral vibration or rotational vibration. This is because the arm rests 13c and 13d support the operator seated in the chair part 13 when the operator is swung from side to side due to vibration of the electric vehicle H. When the vibration is limited to side-to-side vibration or rotational vibration, it is possible to prevent falling of an operator from the chair part 13 due to vibration on for notification of information. Thus, the notification of information can be performed using vibration with high safety.

As shown in FIG. 8, the alarm unit 21 generates a vibration velocity signal 41 which oscillates around a reference value (0) and has an even number of change regions 41c and 41d between and on both sides of a reference value 41a and a reference value 41b. When vibration has an even number of the change regions 41c and 41d, an acceleration part and a deceleration part are paired and cancel each other out at the end of the vibration velocity signal 41. The change regions 41c and 41d are each either a first change region, which is on one side of the reference values 41a and 41b, or a second change region, which is on the other side of the reference values 41a and 41b. In other words, the change region 41c is an example of the first change region, and the change region 41d is an example of the second change region. The alarm unit 21 generates the vibration velocity signal 41 so that the change region 41c and the change region 41d have substantially equal areas. When the change region 41c and the change region 41d have equal areas, the acceleration part and the deceleration part completely cancel each other out. When the acceleration part and the deceleration part thus cancel each other out, influence of the vibration velocity signal 41 on the target travel velocity is minimized. To put it another way, since acceleration and deceleration completely cancel each other out, the electric vehicle 11 can be operated just as the operator intended.

Alternatively, travel control information may be generated by adding a vibration velocity signal to target travel velocity in the direction of the target travel velocity.

Figure 10:
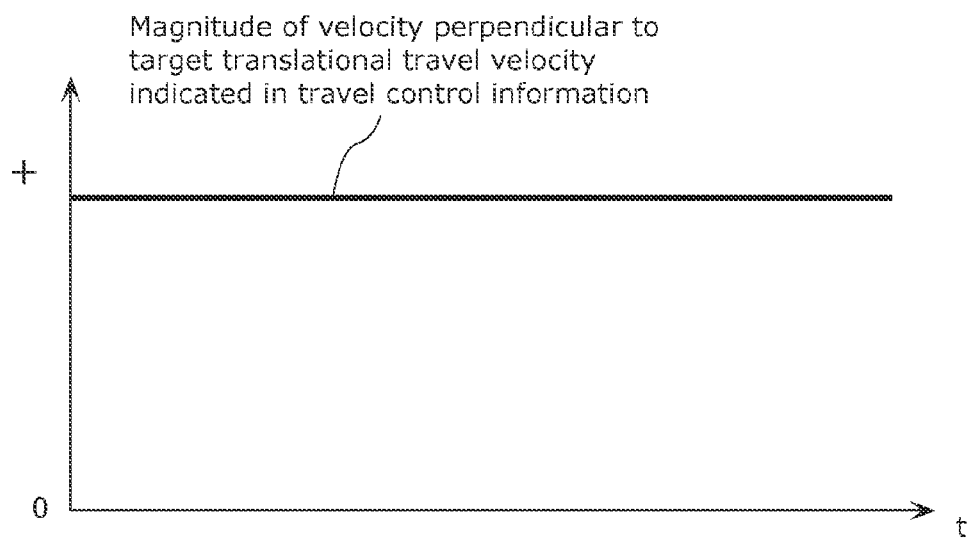
FIG. 10 is a time series chart of travel control information indicating the magnitude of velocity in the direction of a target translational travel velocity according to Embodiment 1.
Figure 11:
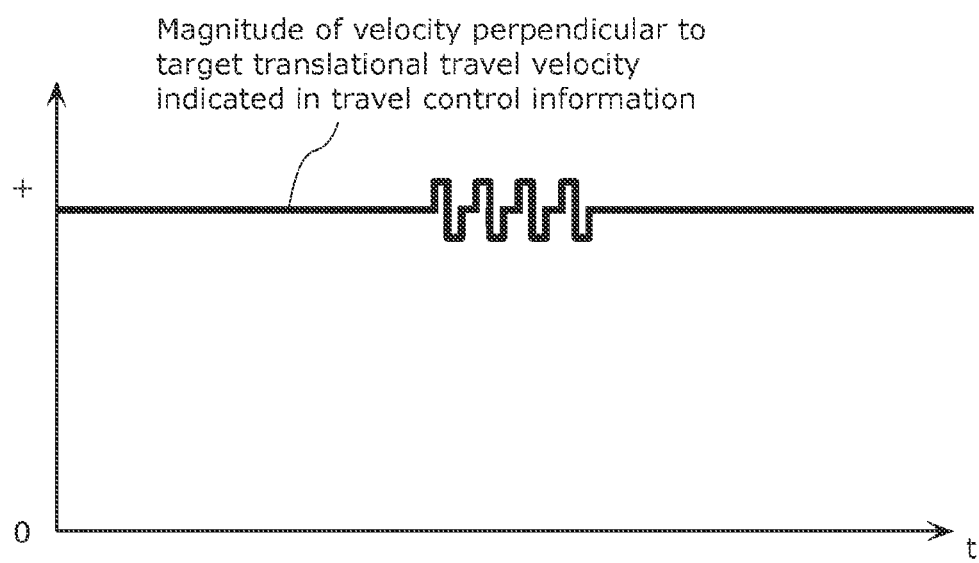
FIG. 11 is a time series chart of travel control information indicating the magnitude of velocity in the direction of a target translational travel velocity to which a vibration velocity signal is added according to Embodiment 1.

FIG. 10 is a time series chart of travel control information indicating the magnitude of velocity in the direction of a target translational travel velocity according to Embodiment 1. FIG. 11 is a time series chart of travel control information indicating the magnitude of velocity in the direction of a target translational travel velocity according to Embodiment 1 after adding a vibration velocity signal to target travel velocity.

When a constant control input is detected while an operator is tilting the joystick 14a of the operation input unit 14 to a certain degree, travel control information indicating the magnitude of velocity in the direction of a target translational travel velocity remains the same as shown in FIG. 10.

When the alarm determination unit 20 determines that it is necessary to notify an operator of information, the alarm unit 21 generates and outputs the vibration velocity signal 41. Upon receiving the vibration velocity signal 41, the travel information generation unit 15 regenerates travel control information shown in FIG. 11 by adding the vibration velocity signal 41 to a target translational travel velocity in the direction of the target translational travel velocity. In Embodiment 1, the vibration velocity signal 41 is generated during a time for a limited duration so that an operator can perceive vibration. This is because an operator will acclimatize to vibration when it endures for a long time. When it happens, the operator may fail to notice notification of necessary information.

Receiving such travel control information, the body part 12 repeats acceleration and deceleration with respect to a target translational travel velocity, and thus does not monotonically decelerate. Thus, in Embodiment 1, the travel control information is has the same size before and after notification of information to an operator. It is thus possible in Embodiment 1 to provide an operator with haptic information using the same travel control information before and after adding a vibration velocity signal to target travel velocity. Furthermore, since the electric vehicle 11 vibrates along the direction of a target translational travel velocity, mechanical load on the body part 12 is small in Embodiment 1.

When the electric vehicle 11 vibrates along the direction of a target translational travel velocity, a difference to be reduced may occur between target travel velocity and actual travel velocity. In order to reduce the difference of the travel velocity of the body part 12 from the target travel velocity, it is preferable that the electric vehicle 11 be provided with a feedback unit for adjusting rotation of the actuators. The feedback unit adjusts rotation of the actuators to reduce a difference between the target travel velocity and actual travel velocity, so that an operator can operate the electric vehicle more correctly.

Furthermore, the alarm unit 21 may generate vibration velocity signals each having a different square wave pattern. Thus, it is possible to notify an operator of different types of information using signals of different square wave pattern.

Figure 12:
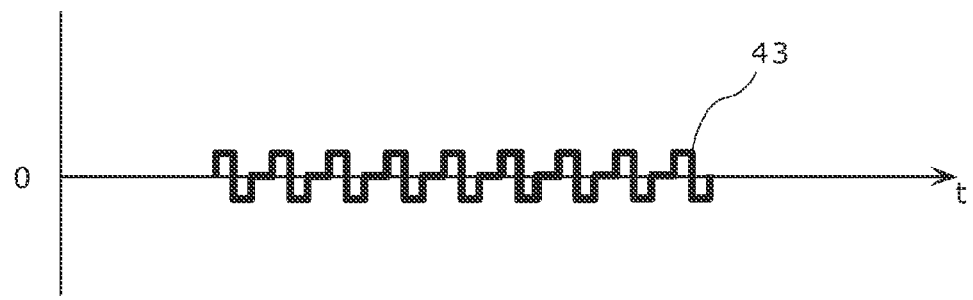
FIG. 12 is a time series chart of another vibration velocity signal according to Embodiment 1.
Figure 13:
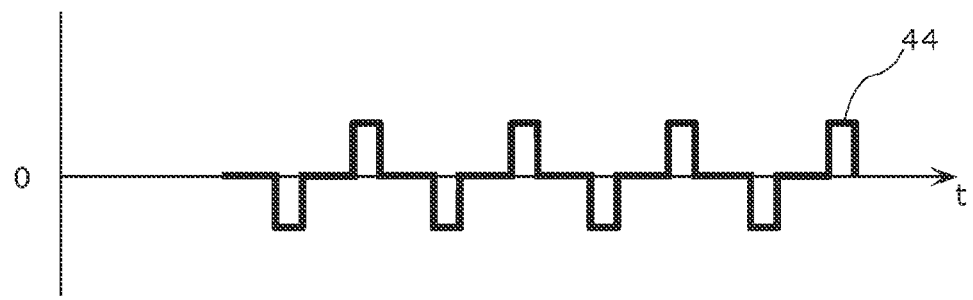
FIG. 13 is a time series chart of another vibration velocity signal according to Embodiment 1.
Figure 14:
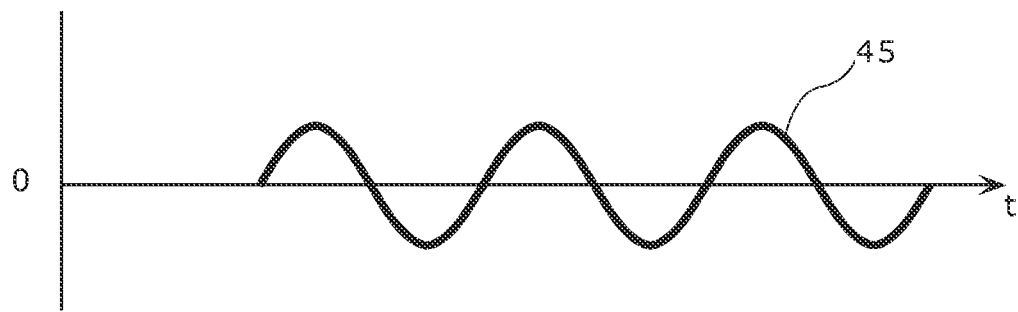
FIG. 14 is a time series chart of another vibration velocity signal according to Embodiment 1.
Figure 15:
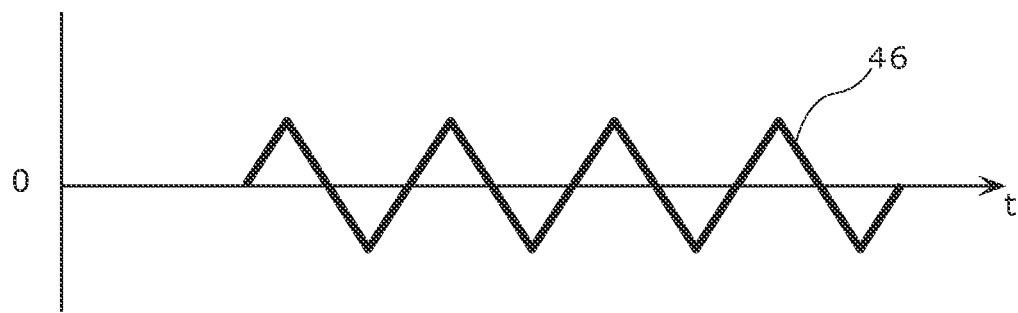
FIG. 15 is a time series chart of a vibration velocity signal having not a square waveform but a triangle waveform according to Embodiment 1.
Figure 16:
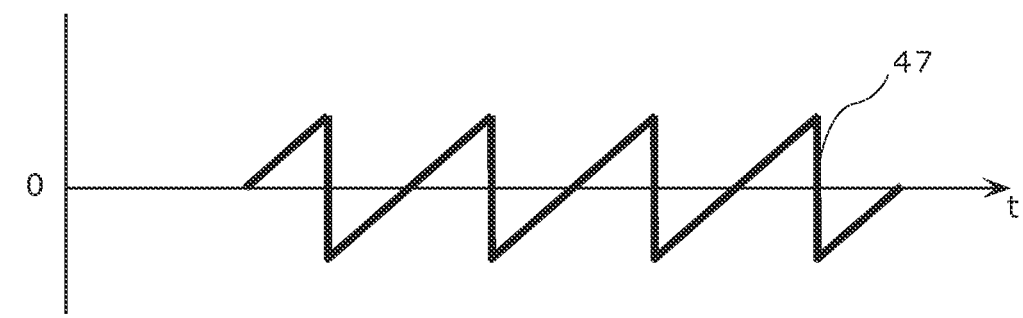
FIG. 16 is a time series chart of a vibration velocity signal having not a square waveform but a sawtooth waveform according to Embodiment 1.

FIG. 12 and FIG. 13 each are a time series chart of another vibration velocity signal according to Embodiment 1. FIG. 14, FIG. 15, and FIG. 16 each are a time series chart of a vibration velocity signal having a waveform other than a square waveform according to Embodiment 1. As indicated by a vibration velocity signal 43 shown in FIG. 12, vibration may have a higher frequency with a shorter period. Alternatively, as a vibration velocity signal 44 shown in FIG. 13, the vibration velocity signal may have a square waveform indicating uniform intervals between vibrations.

The alarm unit 21 outputs vibration velocity signals switching between the vibration velocity signals 41, 42, 43, and 44 depending on information to be notified to an operator, so that the operator can distinguish several types of information on the basis of the types of vibration of the electric vehicle 11.

Alternatively, the vibration velocity signal may be a vibration velocity signal 45 which is not a square wave but a sine wave as shown in FIG. 14. Alternatively, the vibration velocity signal may be a vibration velocity signal 46 which is a triangle wave as shown in FIG. 15. Alternatively, the vibration velocity signal may be a vibration velocity signal 47 which is a sawtooth wave (blaze wave) as shown in FIG. 16.

For example, it is preferable to set a vibration velocity signal which the travel information generation unit 15 generates to have waves (for example, square waves) at a frequency not less than 0.5 Hz and not more than 10 Hz, so that load on the actuators 32 while the body part 12 is vibrating is moderated. It is generally known that sensitivity of a person to vibration of vehicles or the like depends not only on vibrational acceleration but also on the frequency of vibration. Specifically, it is known that vibration having a smaller frequency are more perceivable even when its vibrational acceleration is small. Vibration having a small vibrational acceleration and a small frequency is perceived as large vibration. As such, load on the actuators 32 can be moderated by setting a vibration velocity signal which the travel information generation unit generates to have square waves at a frequency not less than 0.5 Hz and not more than 10 Hz and a smaller amplitude. With this, it is possible to avoid decreasing the lives of the actuators 32 and make maintenance of the electric vehicle 11 easier.

In the above description, the electric vehicle 11 calculates a target travel velocity based on a steering direction and a control input via the operation input unit 14 and generates travel control information based on the target travel velocity. Alternatively, the electric vehicle 11 may detect only operating force and calculate a target travel propulsion force based on the operating force and generate travel control information based on the target travel propulsion force. In this case, the electric vehicle 11 detects an operating force input via the operation input unit 14. Next, the travel information generation unit 15 generates travel control information based on the operating force. The control unit 16 controls the actuators 32 based on the travel control information. Upon receiving a vibration force signal, the travel information generation unit 15 adds the vibration force signal to the travel control information. When the electric vehicle 11 notifies an operator of information, the travel information generation unit 15 generates travel control information by adding a vibration force signal to target travel propulsion force. Upon receiving the travel control information, the body part 12 vibrates with respect to the travel propulsion force. The electric vehicle 11 thus travels based on operation by the operator even when notification of information to the operator is made using vibration. As described above, the electric vehicle 11 may vibrate perpendicularly to or parallel to the steering direction, or along a rotational direction. The rotational center may be shifted depending on the position of a detected obstacle.

[Embodiment 2]

Figure 17:
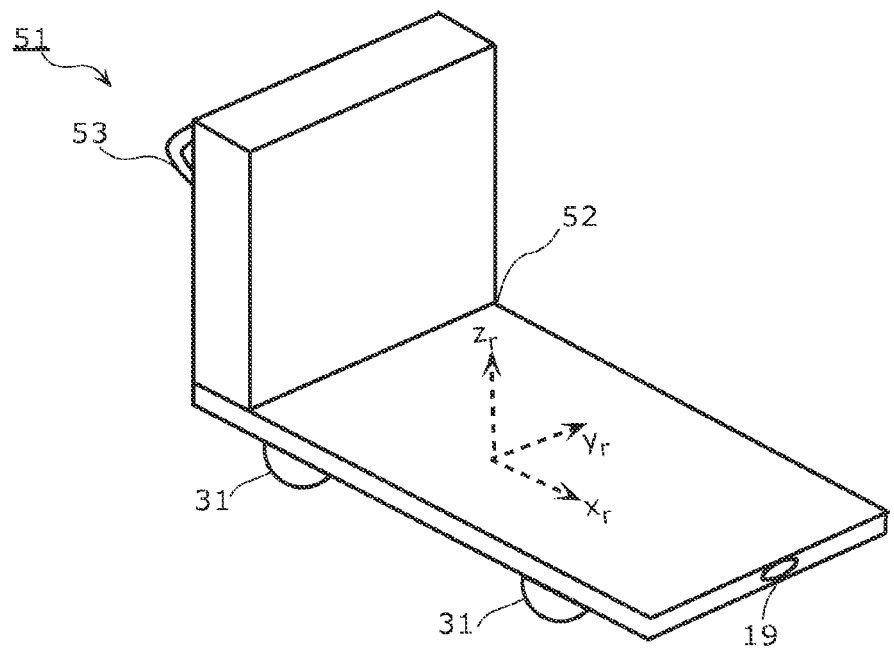
FIG. 17 is a perspective view of an electric vehicle according to Embodiment 2 of the present invention.
Figure 18:
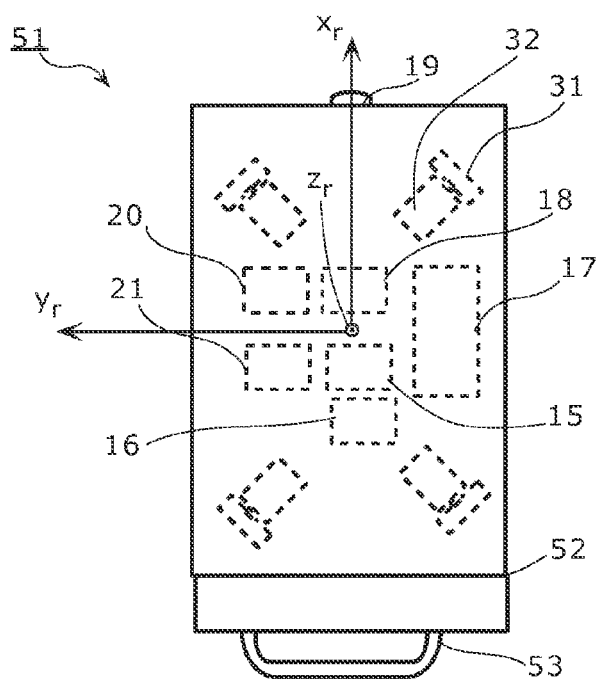
FIG. 18 is a plan view of the electric vehicle according to Embodiment 2 of the present invention.

FIG. 17 and FIG. 18 illustrate an electric vehicle 51 according to Embodiment 2 of the present invention. FIG. 17 is a perspective view of the electric vehicle 51. FIG. 18 is a plan view of the electric vehicle 51.

The following describes differences of Embodiment 2 from Embodiment 1 with reference to the drawings. As shown in FIG. 17 and FIG. 18, the electric vehicle 51 is an electric carrier cart which moves while being pushed (or pulled) by an operator.

The electric vehicle 51 includes: a body part 52; a handle unit 53 which is an operation input unit to detect input of a steering direction and a control input; a travel information generation unit which calculates a target travel velocity (target translational travel velocity and target rotational travel velocity) from a steering direction and a control input and generates travel control information based on the target travel velocity; and a control unit 16. The handle unit 53 is an operator-contact part provided on the body part 52.

The handle unit 53 serves not only as an operator-contact part but also as an operation input unit. The handle unit 53 detects a control input provided by an operator and a steering direction input by the operator based on the direction of inclination of the handle 53.

When information is notified to an operator, the travel information generation unit 15 generates travel control information by adding a vibration velocity signal to target travel velocity.

Upon receiving the travel control information, the body part 52 vibrates along the $y_r$ axis. The electric vehicle 51 travels at the same speed before and after notification of information to an operator. With this, the electric vehicle 51 provides an operator with haptic information without causing a change in travel velocity before and after adding a vibration velocity signal to target travel velocity. Furthermore, the electric vehicle 51 is capable of providing an operator with haptic information though the handle unit 53 using the actuators 32 which the electric vehicle 51 has already included, that is, without using any new drive source.

[Embodiment 3]

Figure 19:
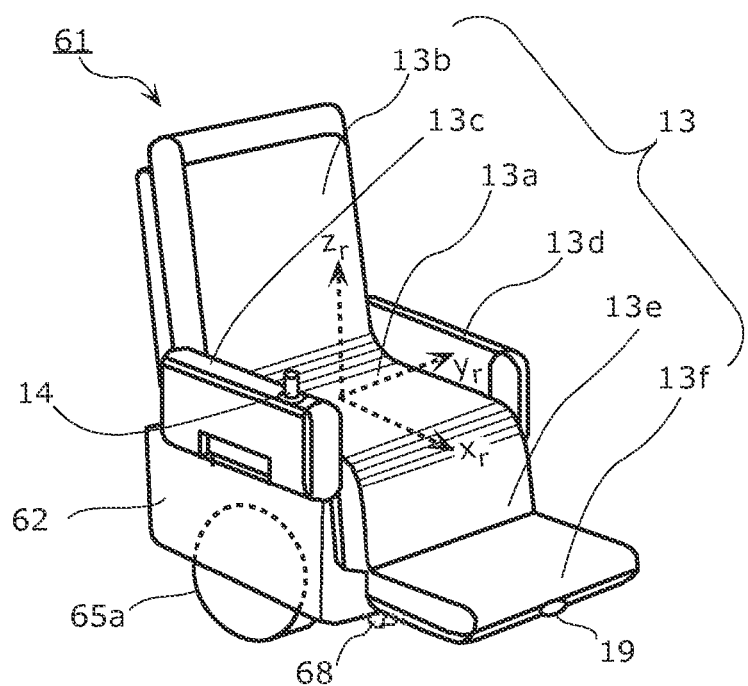
FIG. 19 is a perspective view of an electric vehicle according to Embodiment 3 of the present invention.
Figure 20:
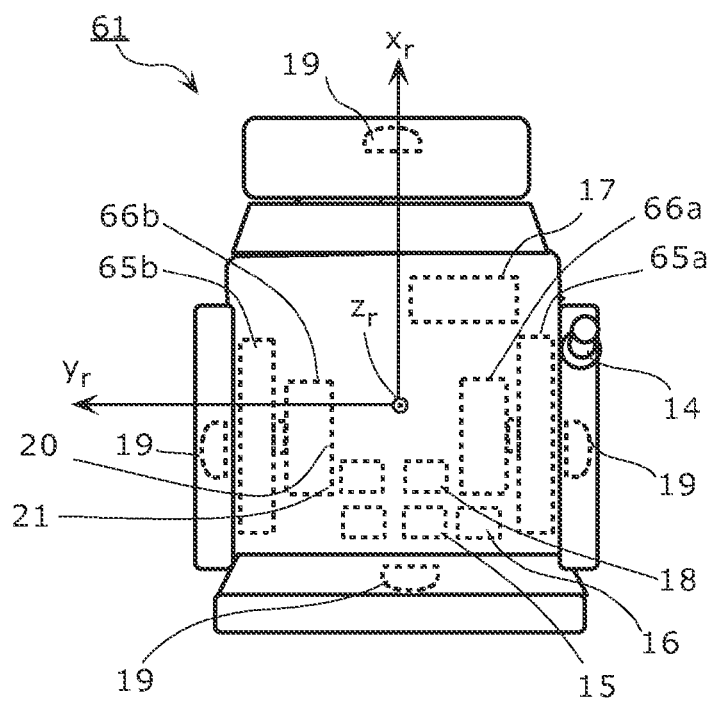
FIG. 20 is a plan view of the electric vehicle according to Embodiment 3 of the present invention.
Figure 21:
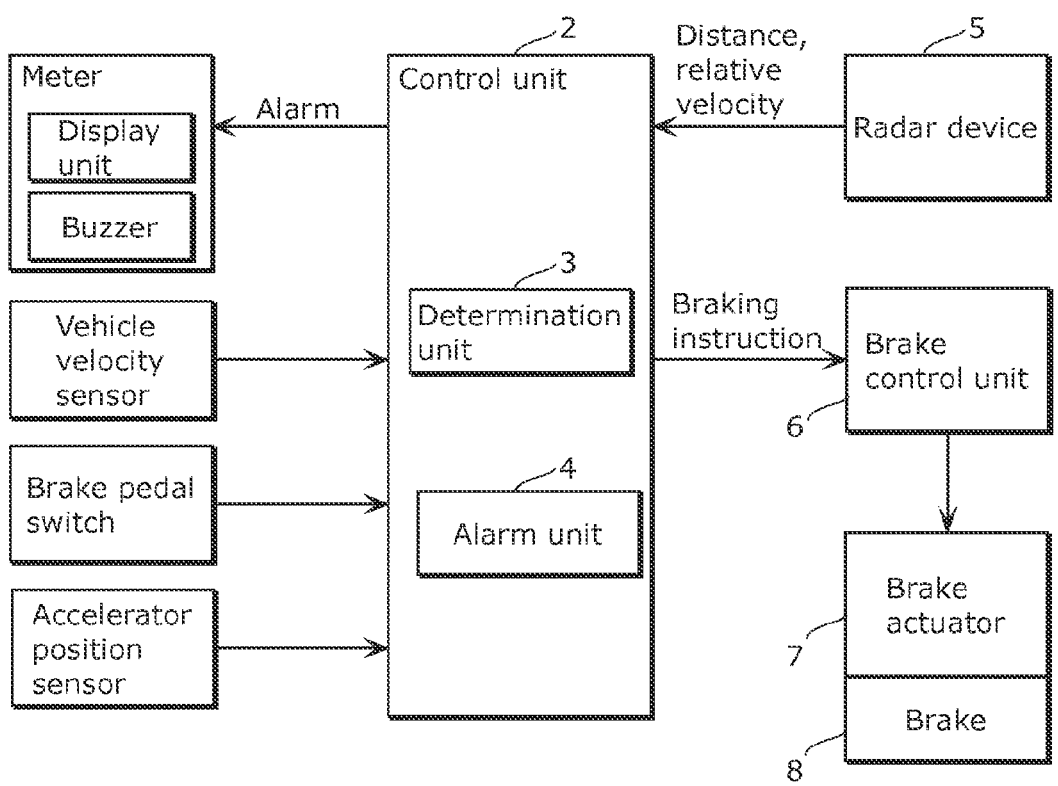
FIG. 21 is a system configuration diagram of a conventional braking force control device for motor vehicles.

FIG. 19 and FIG. 20 illustrate an electric vehicle 61 according to Embodiment 3 of the present invention. FIG. 19 is a perspective view of the electric vehicle 61. FIG. 20 is a plan view of the electric vehicle 61.

The following describes differences of Embodiment 3 from Embodiment 1 with reference to the drawings. As shown in FIG. 19 and FIG. 20, the electric vehicle 61 is an electric wheelchair which travels based on operation by an operator seated in a chair part 13, which is an operator-contact part. Compared to the electric vehicle 11 according to Embodiment 1 having four wheels 31 and four actuators 32, the electric vehicle 61 according to Embodiment includes two wheels 65a and 65b, two actuators 66a and 66b, and an auxiliary caster 68.

The electric vehicle 61 includes: a body part 62; a chair part 13 which is an operator-contact part provided on the body part 62; an operation input unit 14 which detects input of a steering direction and a control input; a travel information generation unit 15 which generates a target travel direction based on a steering direction and a target travel velocity based on a control input; and a control unit 16.

The body part 62 has the wheel 65a on the right side and the wheel 65b on the left side, and the auxiliary caster 68, which is not connected to the actuator 66a or 66b in the front. Thus, the electric vehicle 61 is a two-independent-wheel-drive vehicle. The body part 62 further includes actuators 66a and 66b which drive the wheel 65a and the wheel 65b independently of each other. More specifically, the wheel 65a and the wheel 65b each have its rotary shaft extending along the $y_r$ axis. Each of the wheels 65a and 65b is a general tire each having a rubber tube covering the rim thereof. As described above, the electric vehicle 61 is a two-independent-wheel-drive vehicle. More specifically, such a vehicle has two wheels which are provided with the respective actuators 32 and rotate independently of each other driven by the respective actuators 32. Synchronous rotation of the two wheels allows the electric vehicle 11 to do translational travel. When the two wheels rotate at different speeds, the electric vehicle 11 does rotational travel. The auxiliary caster 68 is provided in order to prevent the chair part 13 from tilting at a large angle. More specifically, the wheels 65a and 65b and the auxiliary caster 68 are arranged at corners of a triangle so that the wheels 65a and 65b and the auxiliary caster 68 may maintain the body part 62 in a horizontal position.

The body part 62 is not capable of traveling in all directions but is capable of changing its travel direction by differentiating the rotational speed of the wheel 65a and the wheel 65b. Such wheel configuration of the two-independent-wheel-drive vehicle is the most popular wheel configuration of electric wheelchairs commercially available.

When the travel information generation unit 15 receives a vibration velocity signal, the electric vehicle 61, which is a two-independent-wheel-drive vehicle, generates travel control information by adding the vibration velocity signal to a target translational travel velocity or a target rotational travel velocity.

When the electric vehicle 61 is vibrated with respect to a target translational travel velocity, the electric vehicle 61 repeats acceleration and deceleration with respect to the target translational travel velocity, and thus does not monotonically decelerate. Thus, the electric vehicle 61 is capable of notifying an operator of information using vibration without influencing the magnitude of the target translational travel velocity. Furthermore, since the electric vehicle 61 vibrates along the direction of the target translational travel velocity, mechanical load on the body part is small. When the electric vehicle 61 is vibrated with respect to a target rotational travel velocity, the electric vehicle 61 rotationally vibrates with respect to the target rotational travel velocity. Thus, the electric vehicle 61 is capable of notifying an operator of information using vibration without influencing the magnitude of the target translational travel velocity.

It is to be noted that present invention is not limited to the present embodiment. For example, in another embodiment of the present invention, the components described in the present description may be optionally combined or omitted. The present invention also includes variations of the embodiments conceived by those skilled in the art unless they depart from the spirit and scope of the present invention, that is, the wording in the claims.

INDUSTRIAL APPLICABILITY

The electric vehicle according to the present invention notifies an operator of information using vibration of the body part, and is usable as an electric wheelchair which travels with an operator aboard or an electric carrier cart which travels accompanied by an operator.

REFERENCE SIGNS LIST 11, 51, 61 Electric vehicle
12, 52, 62 Body part
13 Chair part
13a Seat
13b Back rest
13c, 13d Arm rest
13e Leg rest
13f Foot rest
14 Operation input unit
14a Joystick
15 Travel information generation unit
16 Control unit
17 Battery unit
18 Battery monitor unit
19 Obstacle sensor
20 Alarm determination unit
21 Alarm unit
31, 65a, 65b Wheels
32, 66a, 66b Actuators
41, 42, 43, 44, 45, 46, 47 Vibration velocity signal
41a, 41b Reference value
41c, 41d Change region
53 Handle unit
68 Auxiliary caster

The invention claimed is:
1. An electric vehicle which travels by driving actuators, the electric vehicle comprising:
a monitor unit configured to monitor external environment or internal environment of the electric vehicle;
an alarm unit configured to output a vibration velocity signal indicating velocity and vibration, based on monitoring information obtained by the monitor unit, the velocity being changeable in a cycle, and the vibration being larger when the vibration velocity signal is based on the monitoring information on the external environment of the electric vehicle than when the vibration velocity signal is based on the monitoring information on the internal environment of the electric vehicle;
a travel information generation unit configured to calculate a target travel velocity based on a steering direction and a control input provided by an operator of the electric vehicle, and generate travel control information for controlling the actuators based on the target travel velocity; and
a control unit configured to control the actuators based on the travel control information,
wherein the travel information generation unit is configured to regenerate the travel control information by adding the vibration velocity signal to the target travel velocity upon receiving the vibration velocity signal.
2. The electric vehicle according to claim 1,
wherein the target travel velocity includes a target translational travel velocity which is a target velocity of trans- lational travel of the electric vehicle and a target rotational travel velocity which is a target velocity of rotational travel of the electric vehicle, and the travel information generation unit is configured to regenerate the travel control information by adding the vibration velocity signal to the target translational travel velocity perpendicularly to a direction of the target velocity of the translational travel upon receiving the vibration velocity signal.

3. The electric vehicle according to claim 1,
wherein the target travel velocity includes a target translational travel velocity which is a target velocity of translational travel of the electric vehicle and a target rotational travel velocity which is a target velocity of rotational travel of the electric vehicle, and the travel information generation unit is configured to regenerate the travel control information by adding the vibration velocity signal to the target translational travel velocity in a direction of the target translational travel velocity upon receiving the vibration velocity signal.

4. An electric vehicle which travels by driving actuators, the electric vehicle comprising:
   a monitor unit configured to monitor external environment or internal environment of the electric vehicle;
   an alarm unit configured to output a vibration velocity signal based on monitoring information obtained by the monitor unit, the vibration velocity signal indicating velocity which changes in a cycle;
   a travel information generation unit configured to calculate a target travel velocity based on a steering direction and a control input provided by an operator of the electric vehicle, and generate travel control information for controlling the actuators based on the target travel velocity; and
   a control unit configured to control the actuators based on the travel control information,
   wherein the target travel velocity includes a target translational travel velocity which is a target velocity of translational travel of the electric vehicle and a target rotational travel velocity which is a target velocity of rotational travel of the electric vehicle, and
   the travel information generation unit is configured to regenerate the travel control information by adding the vibration velocity signal to the target translational travel velocity in a direction of the target translational travel velocity upon receiving the vibration velocity signal,
   the alarm unit is configured to shift a rotational center of the target rotational travel velocity left of the electric vehicle when the monitor unit detects an obstacle right of the electric vehicle, the obstacle right of the electric vehicle being an example of the external environment, and
   the alarm unit is configured to shift the rotational center of the target rotational travel velocity right of the electric vehicle when the monitor unit detects an obstacle left of the electric vehicle, the obstacle left of the electric vehicle being an example of the external environment.

5. The electric vehicle according to claim 1,
wherein the electric vehicle includes two wheels which are driven independently of each other.

6. the electric vehicle according to claim 1, further comprising
a feedback unit configured to adjust rotation of the actuators, based on a difference between a travel velocity of the electric vehicle and the target travel velocity.

7. The electric vehicle according to claim 1,
wherein the alarm unit is configured to generate vibration velocity signals each having a different wave pattern.

8. The electric vehicle according to claim 1,
wherein the vibration velocity signal generated by the alarm unit oscillates around a reference value and has an even number of change regions on both sides of the reference value.

9. The electric vehicle according to claim 8,
wherein the change regions are each either a first change region or a second change region, the first change region being on one side of the reference value, and the second change region being on the other side of the reference value, and
the alarm unit is configured to generate the vibration velocity signal such that the first change region and the second change region have substantially equal areas.

10. The electric vehicle according to claim 1, further comprising:
    a chair part in which the operator is seated and which is capable of vibrating based on the travel control information based on the vibration velocity signal; and
    an operation input unit through which the operator provides the control input to the electric vehicle.

11. A method of controlling an electric vehicle which travels by driving actuators, the method comprising:
    monitoring external environment or internal environment of the electric vehicle to obtain monitoring information;
    outputting a vibration velocity signal indicating velocity and vibration, based on the monitoring information, the velocity being changeable in a cycle, and the vibration being larger when the vibration velocity signal is based on the monitoring information on the external environment of the electric vehicle than when the vibration velocity signal is based on the monitoring information on the internal environment of the electric vehicle;
    calculating a target travel velocity based on a steering direction and a control input provided by an operator of the electric vehicle, generating travel control information for controlling the actuators based on the target travel velocity, and upon receiving the vibration velocity signal, regenerating the travel control information by adding the vibration velocity signal to the target travel velocity; and
    controlling the actuators based on the travel control information.

* * * * *